Figure 1:
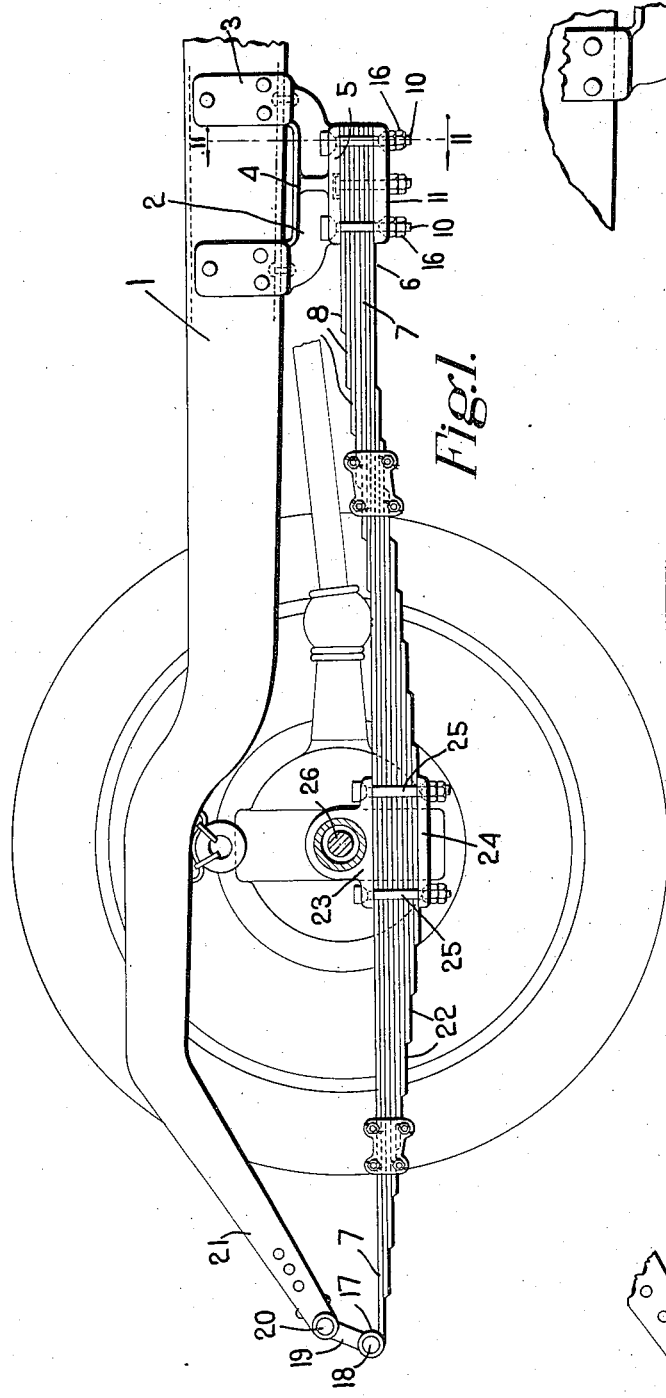

Oct. 30, 1923.

R. M. LOVEJOY 1,472,482

SPRING CONSTRUCTION FOR VEHICLES

Filed July 2, 1920      3 Sheets-Sheet 1

INVENTOR
RALPH M. LOVEJOY
by Heard Smith & Tennant.
ATTORNEYS.

Oct. 30, 1923.
R. M. LOVEJOY
SPRING CONSTRUCTION FOR VEHICLES
Filed July 2, 1920   3 Sheets-Sheet 2
1,472,482
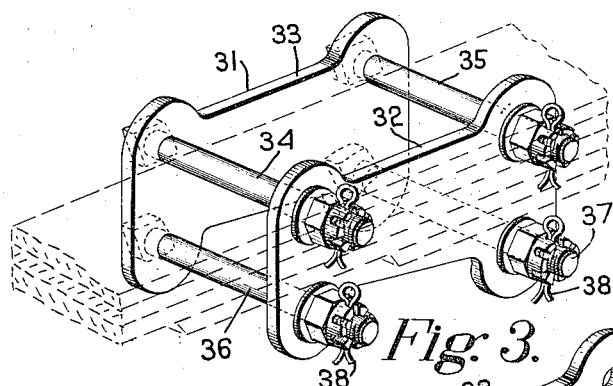
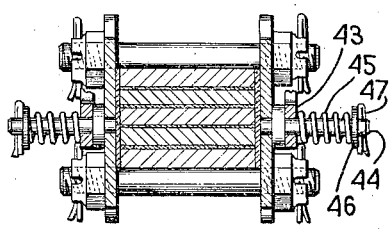
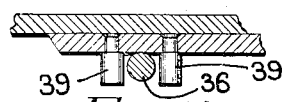
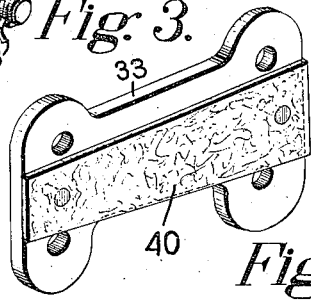
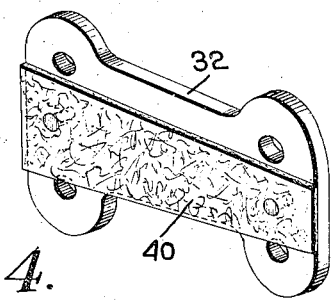
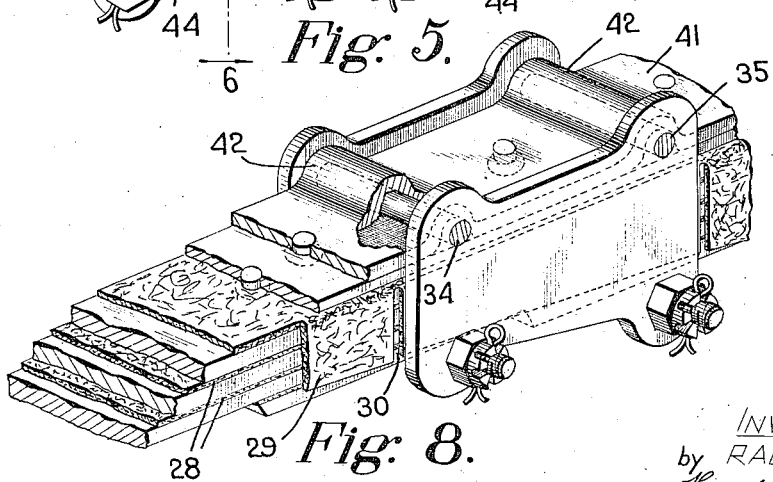
INVENTOR
by RALPH M. LOVEJOY
Heard Smith & Tennant
ATTORNEYS Oct. 30, 1923.  
R. M. LOVEJOY  
SPRING CONSTRUCTION FOR VEHICLES  
Filed July 2, 1920

1,472,482

3 Sheets-Sheet 3

INVENTOR  
by RALPH M. LOVEJOY  
Heard Smith & Tennant  
ATTORNEYS

Patented Oct. 30, 1923.

1,472,482

UNITED STATES PATENT OFFICE.

RALPH M. LOVEJOY, OF MEREDITH, NEW HAMPSHIRE.

SPRING CONSTRUCTION FOR VEHICLES.

Application filed July 2, 1920. Serial No. 393,536.

*To all whom it may concern:*

Be it known that I, RALPH M. LOVEJOY, a citizen of the United States, and resident of Meredith, county of Belknap, State of New Hampshire, have invented an Improvement in Spring Constructions for Vehicles, of which the following description, in connection with the accompanying drawing, is a specification, like characters on the drawing representing like parts.

This invention relates to improvements in spring constructions for vehicles, such as automobiles and the like.

One of the objects of the invention is to provide a spring construction comprising a series of leaves having novel anti-friction instrumentalities interposed between adjacent leaves of the spring.

A further object of the invention is to provide novel means for clamping the leaves of the spring together and for preventing the lateral displacement of the anti-friction instrumentalities which are interposed between said leaves.

A further object of the invention is to provide means for excluding dust from the springs and for providing means for maintaining the leaves in a suitable state of lubrication.

Another object of the invention is to provide improved means for clamping the springs to a supporting frame and to the axle which will engage firmly the edges of the spring and prevent lateral displacement thereof, said means being so constructed as automatically to force the clamping bolts firmly against the edges of the springs.

Other objects and features of the invention will more fully appear from the following description and the accompanying drawings and will be pointed out in the annexed claims.

A preferred embodiment of my invention is disclosed herein as applied to springs of an automobile or other vehicle, but it will be understood that the same is of universal adaptation and may be employed in connection with any construction in which the use of springs comprising a series of superimposed leaves is desirable.

Figure 2:
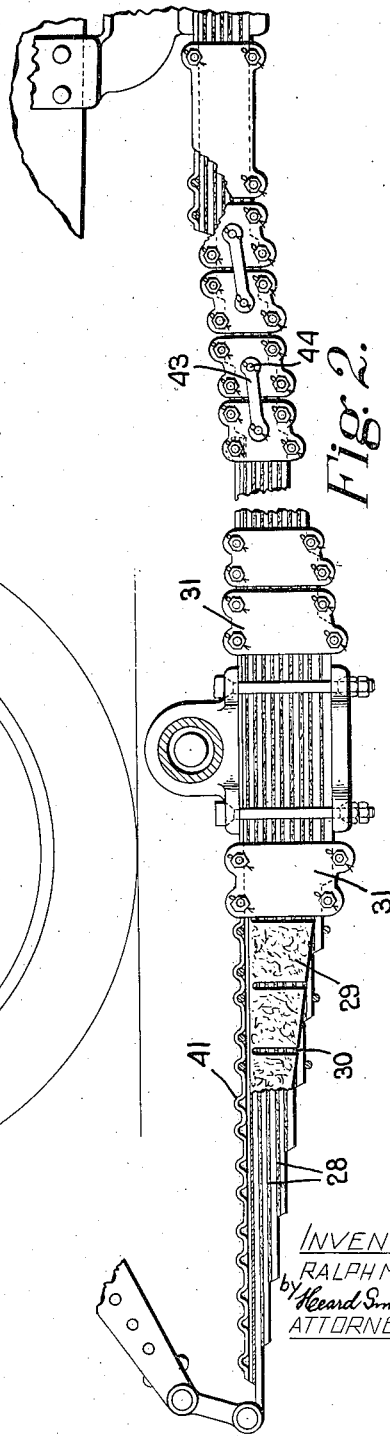

In the drawings:

Fig. 1 is a side elevation of one end of an automobile frame showing the spring embodying my invention connected to said frame and to the axle of a wheel, Fig. 2 is a side view showing a number of clamping members for the springs applied thereto; also, illustrating a form of lubricating means which may be employed, Fig. 3 is a detail view in perspective of the clamping means as applied to a spring, this spring being shown in dotted lines as in phantom, Fig. 4 is a view of two complementary plates of the clamping members with antifriction and lubricating instrumentalities secured thereto, Fig. 5 is a detail side elevation showing adjacent clamping plates secured to the spring and connected together by a suitable link, Fig. 6 is a vertical sectional view through the spring and clamping members on lines 6—6— Fig. 5.

Figure 9:
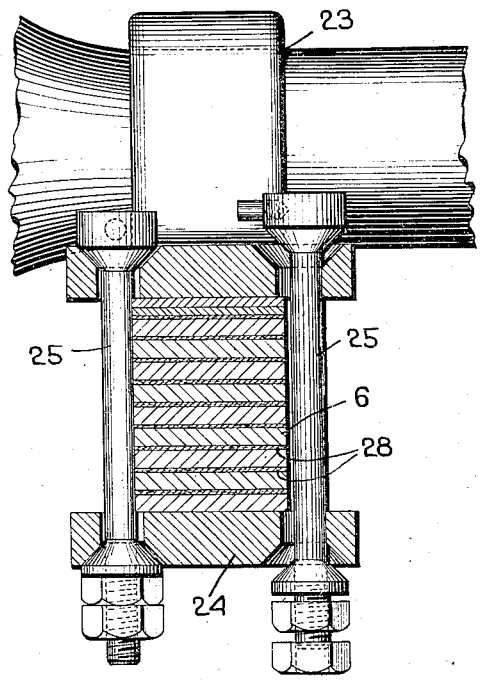
Figure 10:
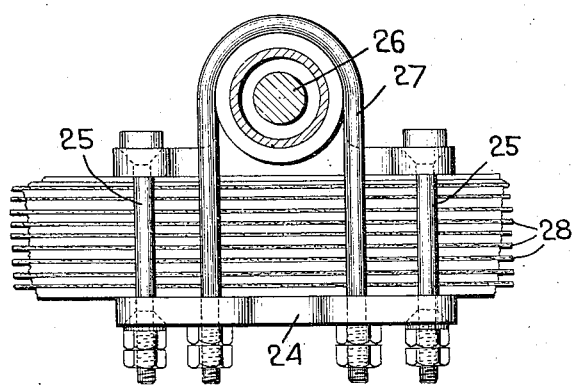
Figure 11:
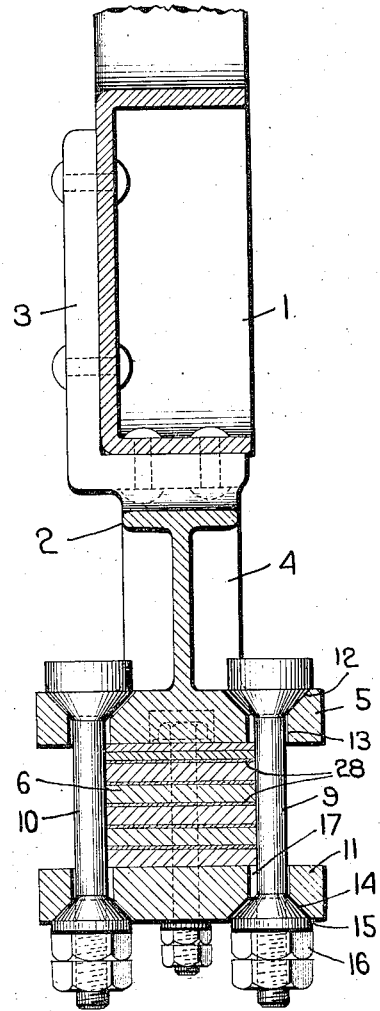

Fig. 7 is a detail sectional view of portions of two leaves of the spring showing retaining studs for holding the clamping members in position, one of the clamping bolts being illustrated in section intermediate of said studs, Fig. 8 is a perspective view of the broken away portions of the spring clamping members and lubricating means in assembled position; also, illustrating a modified form of retaining means for holding the clamping members in position, Fig. 9 is a view, partly in section, showing the means for clamping the spring to the axle housing, illustrating one of the clamping bolts engaging the edges of the spring leaves and the other clamping bolt in the position assumed prior to the setting up of the clamping nuts thereupon, Fig. 10 is a side elevation showing a modified means for clamping the springs to the axle housing, the axle and its housing being shown in section, and, Fig. 11 is a transverse, vertical, sectional view through the frame and spring showing the bracket by which the spring is secured to the frame, portions of the bracket being shown in section.

In the construction of springs formed of superimposed leaves it has been found difficult to maintain a proper state of lubrication between adjacent leaves of the spring and it has also been difficult to prevent the entry of dust between the adjacent leaves so that after a short usage the springs squeak badly. Where anti-friction instrumentalities have been introduced between adjacent leaves of the spring the lateral movement of the leaves relatively to one another, when the spring is under torsional strain, causes the anti-friction instrumentalities to be forced laterally from their seats and eventually to be destroyed.

One of the principal objects of the present invention is to provide means by which suitable anti-friction instrumentalities may be retained properly within the limits of the leaves of the spring throughout the life of the spring and also to provide a suitable anti-friction instrumentality which will be durable and effective. This is accomplished in the present invention by interposing between adjacent leaves of the spring a suitable anti-friction instrumentality which will not be subject to wear and also providing means for preventing lateral displacement of the leaves of the spring or the anti-friction instrumentality.

A preferred embodiment of my invention is disclosed herein as applied to spring constructions used in automobiles in which the spring is suitably secured to the usual automobile frame 1 by a bracket 2 of novel construction which preferably comprises an L-shaped portion 3 suitably riveted to the automobile frame 1 and having a depending web 4 provided at its bottom with a spring seat 5 against the under face of which the spring 6 is clamped. The spring 6 comprises one or more longitudinal spring leaves 7 upon which a series of leaves 8, successively shorter in length, are arranged. This built-up construction is clamped against the under face of the spring seat 5 by bolts 9 and 10 which support a suitable clamping plate 11 which engages the under face of the lowermost spring leaf.

In constructions heretofore made the bolts, which clamp the spring leaves to the seat, are passed through suitably spaced apertures which hold the bolts more or less closely adjacent to the edges of the springs. In boring the holes for such bolts, however, more or less variation occurs so that the bolts do not always engage the edges of the springs, or if they do the wear upon the bolts and their sockets, which is occasioned by usage, permits more or less separation between the bolts and the edges of the springs so that the spring is not clamped effectively between them against lateral displacement.

One of the features of the present invention consists in providing means whereby the bolts will be firmly pressed against the edges of the springs to prevent such lateral displacement and which will enable the bolts to be drawn tightly against said edges notwithstanding wear. This is accomplished by providing the upper ends of the bolts 9 and 10 with conical heads 12 which seat in complementary conical apertures in the upper face of the spring seat 5, the holes 13 through the seat being larger than the bolt 9. These holes are also bored so that their inner margins slightly overlap the edges of the spring leaves. Consequently, the setting up of the bolts tends to draw the same toward the spring so that the stems of the bolts are forced tightly against the edges of the springs.

The clamping plate 11 also is provided with conical seats 14 to receive the conical heads 15 of washers which are forced into the seats 14 by the usual nuts 16. The apertures 17 for the bolts 9, like the apertures 13, are so spaced that their inner margins overlie the edges of the springs. By reason of this construction, therefore, the springs are not only clamped tightly together and against the seat, but the bolts are forced very firmly against the edges of the spring so that there is no opportunity for lateral displacement of the spring leaves. Any wear which may occur may be compensated for by setting up the nuts 16 sufficiently to clamp the springs properly in place.

The opposite end of the long spring leaf, or leaves 7, is provided with an eye 17 by means of which it is connected to the stud 18 of a shackle 19 which is pivotally mounted upon a stud 20 upon the depending end 21 of the frame 1. The portion of the spring beneath the axle housing is likewise of a built-up construction and comprises a series of successively shorter plates 22 which are superimposed upon the under face of the long leaf or leaves 7. This built-up construction is secured to the axle housing 23 by a plate 24 which is clamped against the under face of the spring and to the axle housing by bolts 25 which are provided with conical heads and washers seated in complementary conical sockets having in them apertures for the bolts so that the bolts 25, like the bolts 9 and 10, are clamped firmly against the edges of the springs. The axle housing receives the usual axle 26 for the wheels.

In Fig. 10 a modified construction is shown for securing the axle to the springs. In this construction the axle is secured to the spring by a plurality of pairs of securing devices located upon each side of the axle longitudinally of the spring. As illustrated herein the axle is secured to the plate 24 by a U-shaped bolt 27. This U-shaped bolt may be placed free from the edge of the spring and serves merely to clamp the housing upon the spring. The axle housing, however, is provided with lateral extensions which receive bolts 25 having conical heads and washers which fit in conical sockets in the axle housing extensions and in the plate 24, which serve to draw the bolts inwardly against the edges of the spring as the bolt is set up, thus not only serving to clamp the housing upon the spring, but also to prevent lateral movement of the spring leaves.

In the preferred spring construction disclosed herein layers 28 of anti-friction material are interposed between the adjacent leaves. Any suitable anti-friction material may be used, preferably material of a fibrous nature being employed such as hard wood, like maple, soaked in oil, or brake lining impregnated with a lubricant, and means desirably are provided to maintain the lining in a suitable state of lubrication. This may be accomplished by providing one of the layers of anti-friction material with marginal extensions 29 bent down to overlap the outer edges of the springs, such marginal extensions desirably being provided with slots 30 to permit it to conform to the spring during the flexure of the latter.

It will be noted that in the preferred spring constructions illustrated herein, particularly in the enlarged views, Figs. 2 to 11 inclusive, the edges of the layers of anti-friction material which are interposed between the successive leaves are engaged by the clamping bolts which secure the leaves to the spring seats upon the frame and axle respectively and that the action of the conical heads and conical washers, by forcing these bolts firmly against the edges of the anti-friction material, as well as against the edges of the spring leaves, prevents spreading or displacement of the anti-friction material throughout the area of the spring seats.

In order to prevent lateral displacement of the portions of the anti-friction material which extend beyond the spring seat a series of studs may be introduced in the central portions of the successive leaves, and a cover plate 31 which also serves to space apart the spring clamping plates which will be hereinafter described. By reason of such construction the anti-friction material may be prevented from creeping laterally during the torsional strain placed upon the springs when one wheel of the vehicle is raised more than the other in passing over obstructions and uneven portions in the road.

A further and alternative means of preventing such lateral creeping of the anti-friction material, and also to prevent any substantial lateral displacement of the spring leaves relatively to one another during torsional strain, consists in providing a series of clamping plates in place of the usual spring clips.

In usual spring constructions the leaves are secured together by clips which embrace the springs and are clamped thereto by suitable bolts. In this construction the clips soon become loose and rattle. In the present construction means are provided which not only prevent such rattling, but also positively secure the leaves of the spring against lateral displacement.

In the preferred embodiment of the invention illustrated in the accompanying drawings these spring clamping members comprise a series of pairs of plates 32 and 33 which engage the edges of the springs, said plates being connected together by upper and lower pairs of bolts 34, and 35, 36 and 37. These plates desirably are provided with broadened end portions through which the bolt holes are bored and the bolts are so spaced apart that the bolts 34 and 36 fit tightly against the upper and under faces of one set of leaves, while the bolts 35 and 37 engage the upper and under faces of the next adjacent superimposed leaves.

The screw threaded ends of the bolts desirably are provided with transverse apertures to receive cotter pins 38 which may be passed through suitable slots in the nuts to lock the nuts in proper position when once set up. Any suitable number of these pairs of plates may be applied to the spring, preferably a series of pairs of plates extending throughout the entire length of the spring, so that the leaves are firmly secured against lateral displacement.

By this means sufficient rigidity against lateral flexure of the spring is provided to enable the spring properly to support the axle without the necessity of providing the usual torsion rods which are ordinarily required to prevent breaking of the axle.

In order to prevent displacement of the pairs of plates the lowermost leaves of the springs may be provided with downwardly extending pairs of studs 39 located upon opposite sides of the bolts 36 and 37 which connect the plates 32 and 33.

When this construction is employed the inner faces of the plates may be provided with layers of anti-friction material 40 which may be impregnated with oil so that a proper lubrication of the spring may be maintained.

Other means may also be employed to secure the pairs of clamping plates against lateral displacement. For example, the upper face of the spring may be provided with a cover plate 41 of sheet metal having corrugations 42 to receive the bolts 34 and 35. This construction provides a very neat and ornamental appearance in addition to effectively preventing displacement of the clamping plates.

The adjacent pairs of plates may also be connected by suitable links 43 pivotally mounted upon studs 44 seated in the central portions of the links. These studs may, if desired, be extended sufficiently to receive helical springs 45 abutting at one end against the link 43 and held at the other end by a retaining washer 46 secured in place by a cotter pin 47 or other suitable construction which will prevent rattling.

It will be understood that the embodiment of the invention disclosed herein is illustrative and not restrictive and that various modifications in materials, construction and arrangement of parts may be made within the spirit and scope of the following claims.

Having thus described my invention, what I claim as new and desire to secure by Letters Patent, is:

1. A spring construction comprising a series of superimposed leaves, a layer of fibrous anti-friction material interposed between the adjacent leaves and means engaging the edges of said leaves at intervals and for preventing lateral displacement of said fibrous material.

2. A spring construction comprising a series of superimposed leaves, a layer of fibrous anti-friction material interposed between the adjacent faces of the several superimposed leaves and clamping means engaging the edges of said leaves at intervals for preventing relative lateral displacement of said leaves and said fibrous material.

3. A spring construction comprising a series of superimposed leaves, a layer of fibrous anti-friction material interposed between the adjacent leaves, one or more of said layers of anti-friction material being provided with extensions engaging the edges of said leaves.

4. A spring construction comprising a series of superimposed leaves, a layer of fibrous anti-friction material interposed between the adjacent faces of the several superimposed leaves and means for preventing relative lateral displacement of said leaves and said fibrous material comprising pairs of plates clamped against the edges of said leaves, said plates being connected by pairs of bolts engaging the upper and under surfaces of said spring.

5. A spring construction comprising a series of superimposed leaves, a layer of fibrous anti-friction material interposed between the adjacent leaves and means for preventing relative lateral displacement of said leaves and said fibrous material comprising pairs of plates engaging the edges of said leaves, the upper portions of said plates being connected by pairs of bolts engaging the upper faces of different leaves, the lower portions of said plates being connected by bolts engaging the lower faces of different leaves.

6. In a spring construction comprising a series of superimposed leaves, clamping means comprising a series of pairs of plates engaging the edges of said leaves upper and lower pairs of bolts connecting each pair of plates, one of said pairs of bolts engaging one face of said spring and the other pair of bolts engaging the faces of different spring leaves on the opposite side of said spring.

7. In a spring construction comprising a series of superimposed leaves, clamping means comprising a series of pairs of plates engaging the edges of said leaves, a plurality of pairs of bolts connecting each pair of plates engaging respectively the faces of the upper and under leaves and anti-friction lubricating means overlying said spring and having marginal extensions located intermediate of said plates and the edges of said spring leaves.

8. In a spring construction comprising a series of superimposed leaves, clamping means comprising a series of pairs of plates engaging the edges of said leaves, a plurality of pairs of bolts connecting each pair of plates engaging respectively the faces of the upper and under leaves and means carried by said spring, having means engaging said bolt acting to prevent longitudinal displacement of said plates.

9. In a spring construction comprising a series of superimposed leaves, clamping means comprising pairs of plates engaging the edges of said leaves, a plurality of pairs of bolts connecting said plates engaging respectively the faces of the upper and under leaves, and means for preventing longitudinal displacement of said plates comprising studs projecting downwardly from the lowermost leaf to engage the connecting bolt and prevent movement thereof longitudinally of said spring.

10. In a spring construction comprising a series of superimposed leaves, means for preventing lateral displacement of said leaves, comprising a series of pairs of clamping plates clamped together by pairs of bolts engaging respectively the upper and under faces of said spring and links flexibly connecting together adjacent pairs of plates.

In testimony whereof, I have signed my name to this specification.

RALPH M. LOVEJOY.